Nov. 17, 1964    W. R. HAFSTROM ETAL    3,156,979
CONTAINER OPENER

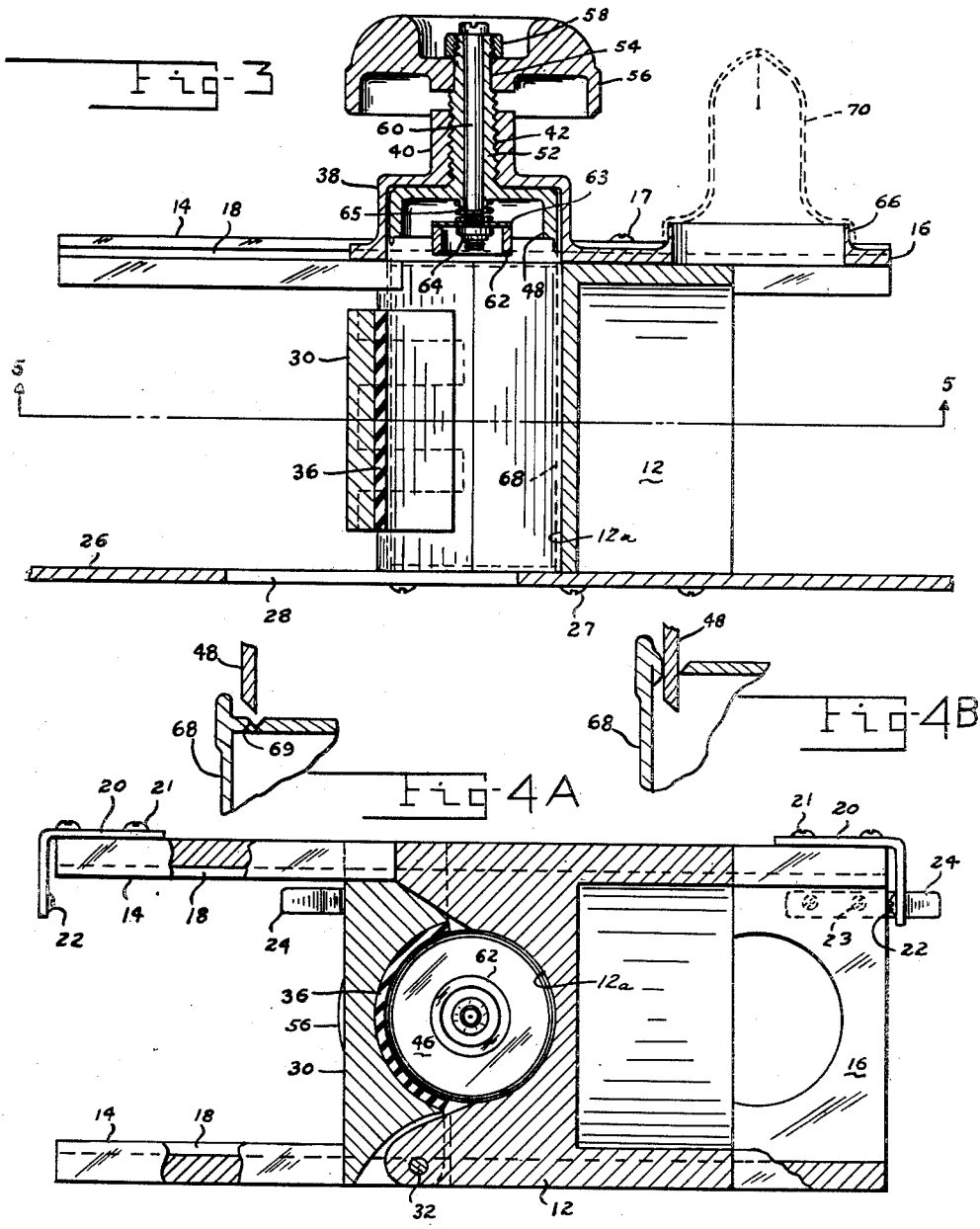

Filed June 19, 1963    3 Sheets-Sheet 3

INVENTORS
WARREN R. HAFSTROM
GEORGE BOSWINKLE
LESTER H. HYNKEL
BY
ATTORNEYS

United States Patent Office 3,156,979
Patented Nov. 17, 1964

3,156,979
CONTAINER OPENER
Warren R. Hafstrom, New Carlisle, Ind., and George Boswinkle, St. Joseph, and Lester H. Hinkel, Benton Harbor, Mich., assignors to the United States of America as represented by the Secretary of the Air Force
Filed June 19, 1963, Ser. No. 289,146
6 Claims. (Cl. 30—6.4)

This invention relates to that class of container openers usually referred to as a "can opener." More specifically, it relates to openers suitable for use on aerospace vehicles; where, because of conditions of zero gravity, conventional openers are not satisfactory.

The present invention opens the food container and installs the mouthpiece over the opened end of the food container which is then ready for insertion into the expulsion device of the co-pending application titled Expulsion Device, by inventors Lester H. Hinkel et al., Serial Number 289,148 and filed June 19, 1963.

Under the zero gravity conditions encountered by aerospace vehicles, objects which are not attached to the vehicle tend to float in the atmosphere within the craft. This can be extremely annoying when such floating objects are food; usually in liquid or semisolid form. Unlike most objects, food which is not properly handled presents a health and odor problem because of bacterial growth. For this and other reasons, the preparation and handling of food on aerospace vehicles becomes a serious problem. Food containers must be opened in order to remove the food; yet food in open containers, and especially food being transferred from the container to the mouth tends to migrate into the atmosphere.

As in other areas connected with space flight, new techniques and methods of feeding are being developed. One of the new techniques is to transfer food directly from a food container into the body by methods minimizing the migration of free food into the atmosphere. This means that the food should remain confined as much as possible. The container opener of the present invention is one device of the new feeding technique. The container opener will open a food container and place a cover over the opened end of the container with minimum exposure of the food to the atmosphere. In other words, a sealed food container goes into the opener, and a sealed container is removed from the opener.

One object of the present invention is to provide a container opener adapted for use in the environmental conditions encountered by manned space vehicles.

Another object of the present invention is to open an individual size food container by severing one end thereof.

A further object of the present invention is to remove the circular end from the container and restrain it against migration under zero gravity conditions.

An additional object of the present invention is to attach a mouthpiece to the opened end of the container as it is removed from the container opener.

A still further object of the present invention is to keep the food container covered during the severing operation and the subsequent operations, in order to prevent migration of the container contents into the atmosphere under zero gravity conditions.

Additional objects, advantages and features of the invention reside in the construction, arrangement and combination of parts involved in the embodiment of the invention as will appear from the following description and accompanying drawings, wherein:

FIG. 3 is a vertical cross section through FIG. 1 showing the position of the food container ready to be opened, and showing the slot in the table top on which the opener is mounted.

FIG. 4A is an enlarged fragmentary cross section through a portion of the food container and cutter just prior to engagement of the cutter with the scored end of the container.

FIG. 4B is a view similar to FIG. 4A and showing the severed container end within the cup of the cutter and the manner in which the cutter rolls down and irons out the raw edge left in the container.

FIG. 5 is a section on line 5—5 of FIG. 3 showing in particular the circular food container cavity, the side rails and the sliding top member.

Figure 6:
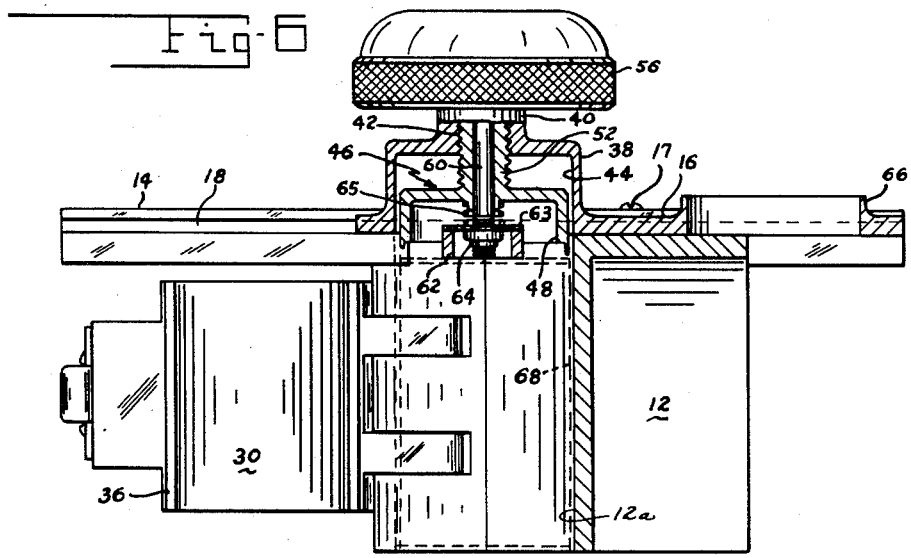
Figure 7:
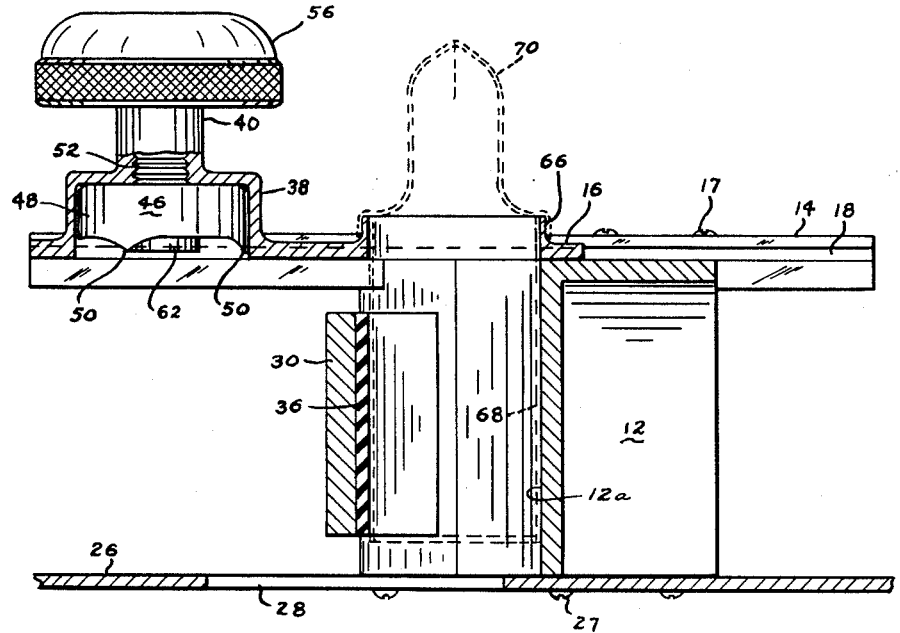

FIG. 6 is a vertical cross section similar to FIG. 3 and showing the relative position of the cutter after the end of the can has been severed, and before the cutter has been retracted to the initial position of FIG. 3, and FIG. 7 is a vertical cross section similar to FIG. 6 with the cutter retracted, and showing the sliding top member in the alternate index position placing the mouthpiece over the opened food container.

Figure 1:
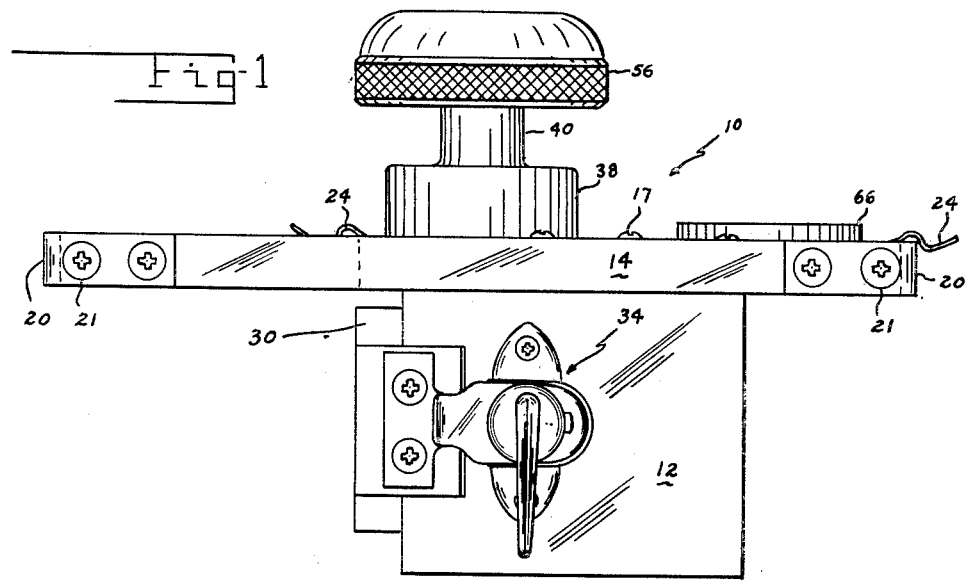
FIG. 1 is a side elevation of the opener with the door latched in the locked position.
Figure 2:
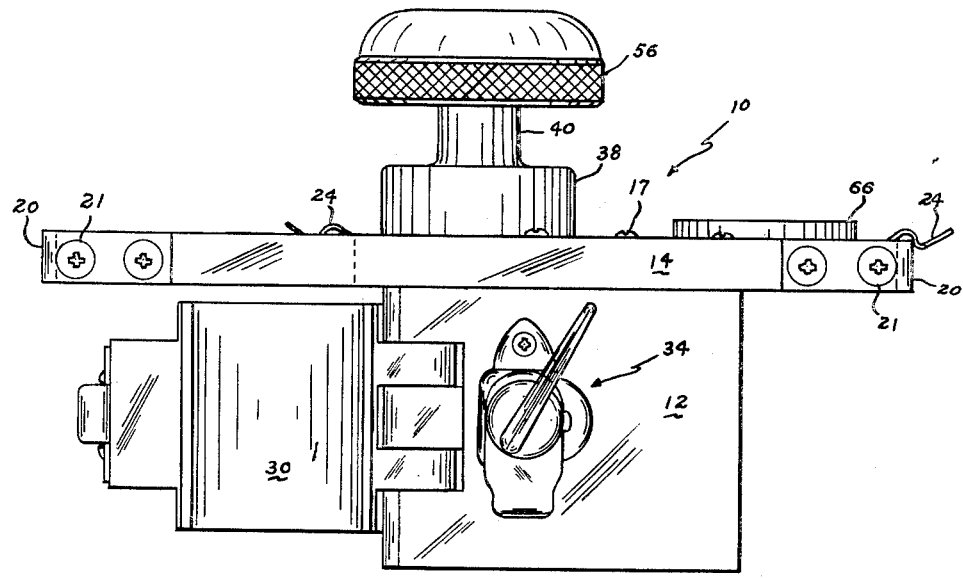
FIG. 2 is a view similar to FIG. 1 and showing the can holding door swung to the open position.

Referring to the drawings, and in particular to FIG. 1 and FIG. 2, the container opener 10, has a body 12 having a semicircular vertical container receiving cavity 12a, guide rails 14, and a two position movable top member such as sliding top 16 as best shown on FIG. 3, FIG. 5, FIG. 6 and FIG. 7. The movable top member has two index positions; each of the positions being movable over the cylindrical axis of the container receiving cavity 12a. The guide rails 14, which are joined to the body 12 by screws 17 may, if desired, be made integral with the body. As best shown on FIG. 3 and the broken out portions of the guide rails on FIG. 5, each guide rail contains a linear groove 18. The linear grooves are normal to the axis of the container receiving cavity 12a, and provide the retaining guides in which the sliding top member 16 is operable. The bottom of the sliding top member 16 has very little clearance above the top of the container in order to minimize food migration.

As best shown on FIG. 1, FIG. 2 and FIG. 5, angle stop brackets 20 are attached to each end on one of the guide rails by means of screws 21. Each stop bracket has a stop button 22 against which the sliding top member 16 comes to rest; and thereby limit the extreme positions of the top member to the alternate index positions. A latch spring 24 is attached to each end of sliding top member 16 by means of screws 23 as shown on FIG. 5. The latch springs releasably hold the sliding top in either of the two index positions by engaging the stop brackets 20. Although, as shown and described, the angle stop brackets 20 are both on one guide rail, such brackets could be placed on both guide rails, if desired.

As shown on FIG. 3 and FIG. 7, the opener is mounted on a horizontal top 26 not constituting a portion of this invention; by screws 27. The horizontal top, which may be any convenient surface joined to the space vehicle, contains an elongated slot 28 which is somewhat narrower than the diameter of the food container on which the opener is to be used, and is positioned lengthwise so that one end thereof is underneath the opener, as shown, and the other end lies outside the base of the opener. The purpose of the elongated slot will be hereinafter explained.

Attached to the left end of body 12, as shown on all figures except 4A and 4B, is a door 30 which is pivotally joined to body 12 by pin 32 shown on FIG. 5, and which is latched in place by latch 34 shown on FIG. 1 and FIG. 2. An ordinary window sash lock has been found to make a very satisfactory latch because of its draw action and convenient operating lever.

As best shown on FIG. 5, the inner curved surface of door 30 is faced with a resilient cushion 36 which may be cemented or otherwise joined in place. The inner curvature of door 30 and cushion 36 are sized so that when a food container is in place and the door is latched, a small amount of pressure is exerted against the food container to hold it resiliently against any relative movement. The cushion 36 may be made of any resilient material such as rubber or neoprene.

As shown on the drawings, the left end of the sliding top member 16 houses the circular or rotary cutter for severing the top of the food container. The sliding top 16 has a circular boss 38 terminating in a stem 40 having internal threads 42. Within circular boss 38 is a cavity 44 containing cutter 46.

Cutter 46 has an inverted circular cup 48 having an external diameter of proper size for ironing out any sharp edges remaining in the container after the end thereof has been severed. The external appearance of the cutter is as best shown on FIG. 7. The rim edge of the cup terminates in a plurality of knife points 50 extending axially from the edge of the cup. The entire edge of the cup, including the knife points, is chisel sharpened as indicated on FIGS. 4A, 4B and 7. Joined to the base of the cup 48 is stem 52 having external threads engaging the internal threads 42 in stem 40 on the circular boss 38.

As best shown on FIG. 3, stem 52 has a reduced diameter 54 for engaging an operating means such as knob 56 which is held in place by nut 58 which engages threads on the end of stem 52. If desired, a conventional key may be added to positively prevent rotation of knob 56 on diameter 54. Stem 52 is axially bored for slidably receiving bolt 60.

As best shown on FIG. 3 and FIG. 6, a circular permanent magnet 62 is joined to a washer 63 which passes over the threaded end of bolt 60 where it is retained by nut 64. A compression spring 65, placed on the bolt 60 between the cup 48 and washer 63, biases the magnet toward nut 64, while providing resilient means permitting the magnet to axially move on the bolt in a manner and for the purpose to be hereinafter described. If desired, the nut 64, which not only retains the magnet and spring, but also adjusts the axial relationship between the bottom of the magnet and the top of the container, may be of the self-locking type such as an Elastic Stop Nut which is commercially available. The magnet should be adjusted to be enough above the container that a severed can end adhering to the magnet will just clear the open rim of the container.

Integral with sliding top 16, on the end opposite circular boss 38, is circular flange 66 having an internal opening slightly larger than the food container for which the opener 10 is designed. The outer diameter of flange 66 is somewhat greater than that portion of the mouthpiece which is to be attached over the open end of the container. As best shown by FIG. 3 and FIG. 7, the sliding top member has two indexed operating positions; the first position being that of FIG. 3, in which the cutter is positioned over the food container, and the second position as shown by FIG. 7, in which the circular flange is positioned over the food container.

The food container 68, shown by dotted lines, is a circular container having circularly prescored ends near the container rims as indicated by score 69 on FIG. 4A, and having a floating piston as described in the referenced co-pending application. Scoring the ends of the containers has been found to be beneficial for the proper opening of the containers and rolling down the raw edges by the chisel-sharpened cutter. Likewise, the mouthpiece 70 is as described in the co-pending application. In use, a flexible mouthpiece 70 is stretched over the circular flange 66 and positioned as shown. Door 30 is then opened and the food container is placed into the cavity of the body using care that the end marked "Top" is up; thus putting the end of the can with the floating piston at the bottom. The door is then closed and latched, and the sliding top placed into the position shown on FIG. 1 and FIG. 3. The cutter is then rotated by turning operating knob 56 until the cutter is in the position shown on FIG. 6 with the cup portion entering into and ironing out any sharp edges remaining in the container.

The severed end of the container is retained by the magnet to which it adheres; and, as the cup portion of the cutter continues to go deeper into the can, the spring compresses the required amount to take up overtravel. After the cutter reaches the position shown on FIG. 6, the direction of rotation of the operating knob is reversed to retract the cutter back to the position shown on FIG. 3. The sliding top member is then moved to the alternate index position, placing the circular flange 66 over the food container as shown on FIG. 7. Since, as previously stated, the magnet is adjusted to hold a severed can end just above the open rim of the container, any food adhering to the bottom of the severed end will be scraped back into the container.

Door 30 is then at least partially opened to release the grip on the food container. The fingers are then inserted through slot 28 in the work table, and with the finger tips pressure is applied to lift the food container through the bore in circular flange 66. As the container emerges from the flange, the end of the container contacts the mouthpiece, causing it to slide from the circular flange and snap onto the open end of the container. With his free hand, the operator then grasps the mouthpiece end of the food container which is removed from the opener and then placed into the expulsion device of the copending application. The severed end of the food container is then removed from the magnet, any loose food particles are removed, and the opener is ready to process another sealed food container.

It is obvious that the opener is equally useful for placing a flexible sealing cover over the open end of the severed container; in lieu of the flexible mouthpiece.

It is to be understood that the embodiment of the present invention as shown and described is to be regarded as illustrative only, and that the invention is susceptible to variations, modifications and changes within the scope of the appended claims.

We claim:

1. A container opener for severing one end of a cylindrical container and installing a flexible mouthpiece or cover over the severed end of the container and comprising: a body having a vertical container receiving cavity, means pivotally joined to said body for releasably restraining the container within the cavity of said body, a top member slidable at the upper end of said body normal to the cylindrical axis of the container, a circular cutter at one end of said top member, said circular cutter being operable for severing the top end of the container, and a circular opening having an upwardly extending flange at the other end of said top member for attaching the flexible mouthpiece to the open end of the severed container as it is axially removed from the container opener through said circular opening.

2. A container opener for severing one end of a cylindrical container and installing a flexible mouthpiece or cover over the severed end of the container and comprising: a body having a vertical container receiving cavity, means pivotally joined to said body for releasably restraining the container within the cavity of said body, a two position top member movably joined to the upper portion of said body for movement normal to the cylindrical axis of the container, said positions being indexed to be substantially in alignment with the cylindrical axis of the container, a circular cutter mounted at one of the index positions of said top member, said circular cutter being operable for severing the top end of the container, magnetic means supported by said circular cutter and positioned to retain the severed end of the container, and a circular opening having an upwardly extending flange at the second index position of said top member for attaching the flexible mouthpiece to the open end of the severed container as it is axially removed from the container opener through said circular opening.

3. A container opener for severing one end of a cylindrical container and installing a flexible mouthpiece or cover over the severed end of the container and comprising: a body having a vertical container receiving cavity, a door pivotally joined to said body, a resilient cushion joined to the inner surface of said door, a latch joined to said body for releasably latching said door into resilient contact between said resilient cushion and the container, a two position top member movably joined to the upper portion of said body for movement normal to the cylindrical axis of the container, said positions being indexed to be substantially in alignment with the cylindrical axis of the container, means joined to said body and limiting the movement of said top member to the index positions, means joined to said top member and releasably holding said top member in the index positions, a circular cutter mounted at one of the index positions of said top member, said circular cutter being operable for severing the top end of the container, a permanent magnet resiliently supported within the structure of said circular cutter and positioned to retain the severed end of the container and hold it above the open rim of the container from which severed, and a circular opening having an upwardly extending flange at the second index position of said top member for attaching the flexible mouthpiece to the open end of the severed container as it is axially removed from the container opener through said circular opening.

4. A container opener for severing one end of a cylindrical container and installing a flexible mouthpiece or cover over the severed end of the container and comprising: a body having at one end thereof a semicircular vertical container receiving cavity open at the top and bottom, means joined to said body for releasably restraining the container within the cavity of said body, two guide rails joined to the upper portion of opposite sides of said body in a manner permitting the cavity in said body to be between said guide rails, each of said guide rails having a linear groove facing a like linear groove in the other guide rail, a top member retainably slidable within the grooves of said guide rails normal to the cylindrical axis of the container, said top member having two index positions at opposite ends each of the positions being movable over the cylindrical axis of the container, a circular cutter operable at the first of the index positions of said top member for severing the adjacent end of the container, a permanent magnet resiliently located within said circular cutter for holding the severed end of the container above the opened end of the container, and a circular opening having an upwardly extending flange at the second index position of said top member for attaching the flexible mouthpiece to the open end of the severed container as it is axially removed from the container opener through said circular opening.

5. A container opener for severing one end of a cylindrical container and installing a flexible mouthpiece or cover over the severed end of the container and comprising: a body having at one end thereof a semicircular vertical container receiving cavity open at the top and bottom, a door pivotally joined to said body for closing against the container within the cavity of said body, a latch joined to said body for releasably latching said door into resilient contact with the container, two guide rails joined to the upper portion of opposite sides of said body in a manner permitting the cavity in said body to be between said guide rails, each of said guide rails having a linear groove facing a like linear groove in the other guide rail, a top member retainably slidable within the grooves of said guide rails normal to the cylindrical axis of the container, said top member having two index positions at opposite ends each of the positions being movable over the cylindrical axis of the container, spring means joined to said top member and releasably holding said top member in the index positions, a circular cup shaped cutter mounted at one of the index positions on the inner side of said top member; said cutter comprising an inverted cup having a threaded stem joined to the base thereof in threaded engagement with and extending outwardly from said top member and further having a plurality of sharpened knife points axially extending from the sharpened rim of the cup for severing the end of the container and rolling down and ironing out the raw edge left in the container, operating means joined to the outer end of the stem on said cutter, a permanent magnet resiliently supported within the structure of said circular cutter and positioned to retain the severed end of the container and hold it above the open rim of the container from which severed, and a circular opening having an upwardly extending flange at the second index position of said top member for attaching the flexible mouthpiece to the open end of the severed container as it is axially removed from the container opener through said circular opening.

6. A container opener for severing one end of a cylindrical container and installing a flexible mouthpiece or cover over the severed end of the container and comprising: a body having at one end thereof a semicircular vertical container receiving cavity open at the top and bottom, a door pivotally joined to said body, a resilient cushion joined to the inner surface of said door, a latch joined to said body for releasably latching said door into resilient contact between said resilient cushion and the container, two guide rails joined to the upper portion of opposite sides of said body in a manner permitting the cavity in said body to be between said guide rails, each of said guide rails having a linear groove facing a like linear groove in the other guide rail, a top member retainably slidable within the grooves of said guide rails normal to the cylindrical axis of the container, said top member having two index positions at opposite ends each of the positions being movable over the cylindrical axis of the container, stop means joined to one or more of said guide rails for limiting the extreme movement of said top member to the index positions, latch springs joined to said top member and releasably holding said top member against said stop means in either index position, a circular cup shaped cutter mounted at one of the index positions on the inner sides of said top member; said cutter comprising an inverted cup having a threaded stem joined to the base thereof in threaded engagement with and extending outwardly from said top member, the cup of said cutter having a plurality of knife points axially extending from the outer circumference and having the knife points and edge of the cup between the knife points sharpened for severing the top end of the container, the outer circumference of the cup being of such diameter as to roll down and iron out any sharp edges remaining in the container after the end thereof has been severed, operating means joined to the outer end of the stem on said cutter, a circular permanent magnet resiliently mounted within the inverted cup of said cutter for movement on the axis of said cutter and positioned to retain the severed end of the container and hold it above the open rim of the container from which severed, and a circular opening having an upwardly extending flange at the second index position of said top member for attaching the flexible mouthpiece to the open end of the severed container as it is axially removed from the container opener through said circular opening, said circular flange extending from the upper surface of said top member and having an outside diameter greater than the unstretched normal diameter of that portion of the mouthpiece to be attached to the container.

References Cited in the file of this patent

UNITED STATES PATENTS

| | | |
|---|---|---|
| 926,112 | Gould | June 29, 1909 |
| 1,145,343 | Workman | July 6, 1915 |
| 1,319,297 | Limacher | Oct. 21, 1919 |